United States Patent [19]
Woynoski et al.

[11] Patent Number: 5,673,309
[45] Date of Patent: Sep. 30, 1997

[54] ATM PHONE CARD SYSTEM

[75] Inventors: Eugene A. Woynoski, Pasadena, Calif.; Carol A. Caldwell, Kirtland Hills, Ohio; Wayne A. Beeder, Arlington; George W. Jensen, Grand Praire, both of Tex.

[73] Assignees: Avery Dennison Corporation, Pasadena, Calif.; GWJ Company; WABK Corporation, both of Grand Praire, Tex.

[21] Appl. No.: 690,932

[22] Filed: Aug. 1, 1996

Related U.S. Application Data

[60] Provisional application No. 60/006,914, Nov. 17, 1995.
[51] Int. Cl.[6] .......................... H04M 15/00; G06F 7/08; G06G 7/48; G07F 7/08
[52] U.S. Cl. .......................... 379/144; 379/114; 395/243; 235/380; 902/14; 283/101; 283/57
[58] Field of Search ..................... 379/91, 112, 114, 379/115, 121, 130, 131, 144, 143, 155; 395/214, 243, 240; 235/379, 380, 381, 381.5; 902/8, 13–15, 26; 283/75, 100, 101, 107, 109, 57, 58, 117, 901, 909

[56] References Cited

U.S. PATENT DOCUMENTS

| | | | |
|---|---|---|---|
| 4,650,977 | 3/1987 | Couch | 235/379 |
| 5,408,417 | 4/1995 | Wilder | 395/243 |
| 5,409,092 | 4/1995 | Itako et al. | 235/381 |
| 5,442,567 | 8/1995 | Small | 235/381 |
| 5,504,808 | 4/1996 | Hamrick, Jr. | 379/144 |

*Primary Examiner*—Curtis Kuntz
*Assistant Examiner*—Paul Loomis
*Attorney, Agent, or Firm*—Christie, Parker & Hale, LLP

[57] ABSTRACT

There is provided a method of dispensing telephone cards from automatic teller machines (ATM) and card constructions used therewith. Telephone time is apportioned to a number of sheetlets printed with random numbers which serve as a personal identification number (PIN). They are packaged in bricks and activated when installed in an ATM or when dispensed. The sheetlets are capable of being dispensed like currency and may contain the PIN on a removable zone.

12 Claims, 5 Drawing Sheets

ATM PHONE CARD SYSTEM

This application is a continuation of provisional application Ser. No. 60/006,914, filed Nov. 17, 1995.

FIELD OF THE INVENTION

The invention relates to the utilization of an automatic teller machine (ATM) for dispensing of telephone (phone) cards and to phone cards for dispensing from an ATM.

BACKGROUND OF THE INVENTION

Widely used in Europe since 1972, the prepaid telephone (phone) card is a debit card which has come into its own in the United States as a means to make long distance calls.

A phone card is normally supplied as a wallet sized card. The user calls a long distance telephone number, dials a personal identification number (PIN) contained on the card, checks the account balance, replenishes it via credit card if it is low, and then completes the call to any select location in a pre-agreed territory. Prepaid amounts range from $10–$50.00 per card.

The main attraction of the phone card is the savings in money on quick calls, along with security against telephone fraud because of the limited amount of money involved. Cost of the calls range from $0.20–0.60 a minute. On calls as little as 3–5 minutes, a telephone card is considered to be less expensive than telephone company calling cards, which have an initial surcharge.

In most countries, prepaid phone cards can be purchased at postal offices, news stands or vending machines normally in sealed containers such as envelopes which secure the PIN until the container is opened.

Automatic teller machines are in wide use as a secured source to dispense money and, most recently, postage stamps. It would be highly desirable to adapt the automatic teller machine to telephone card dispensing. This is the subject of the instant invention.

SUMMARY OF THE INVENTION

The method for providing telephone time using automatic teller machines comprises ordering a predetermined amount of telephone time from a provider of telephone service; proportioning the amount of purchased time into a designated number pre-determined periods of time to define, defining thereby a group of automatic teller machine dispensable sheetlets; printing sheetlets with randomly generated personal identification numbers; packaging a group of sheetlets and providing the package group of sheetlets and recorded personal identification numbers of the sheetlets to the installer of phone cards in automatic teller machines. The groups of sheetlets are installed in an automatic teller machine and telephone service is provided with personal identification numbers on a compact disk. The sheetlets are activated individually or as a batch.

Sheetlets forming the group are dispensed from an automatic teller machine for use on command of a user of the automatic teller machine for use until consumption of a purchased telephone time. Sheetlets which are dispensed from the ATM machine are currency sized and provide a different coefficient of friction on each surface thereof and the coefficient friction differential which enables dispensing of individual sheetlets of the group by caliper or opacity. Sheetlets have a lay flat quality. The sheetlets contain information concerning use of the telephone service as well as a personal identification number (PIN) individualized to the sheetlet. Preferably, the PIN is occluded until exposed at the time of use and may be contained on a segment of the sheetlet which is a separable from bulk of the sheetlet for transfer to another surface. In a preferred construction, the sheetlet is manufactured as a laminate of the first self-supporting surface, a layer of removable pressure sensitive, and a release zone or layer on a second self-supporting layer. The first face layer is die cut to the release zone or layer to allow removal of a portion of the first self- supporting layer. The removable portion contains the PIN and allows it to be transferred to another substrate such as a credit card. In the alternative, it may remain with the phone card.

DETAILED DESCRIPTION

Figure 1:
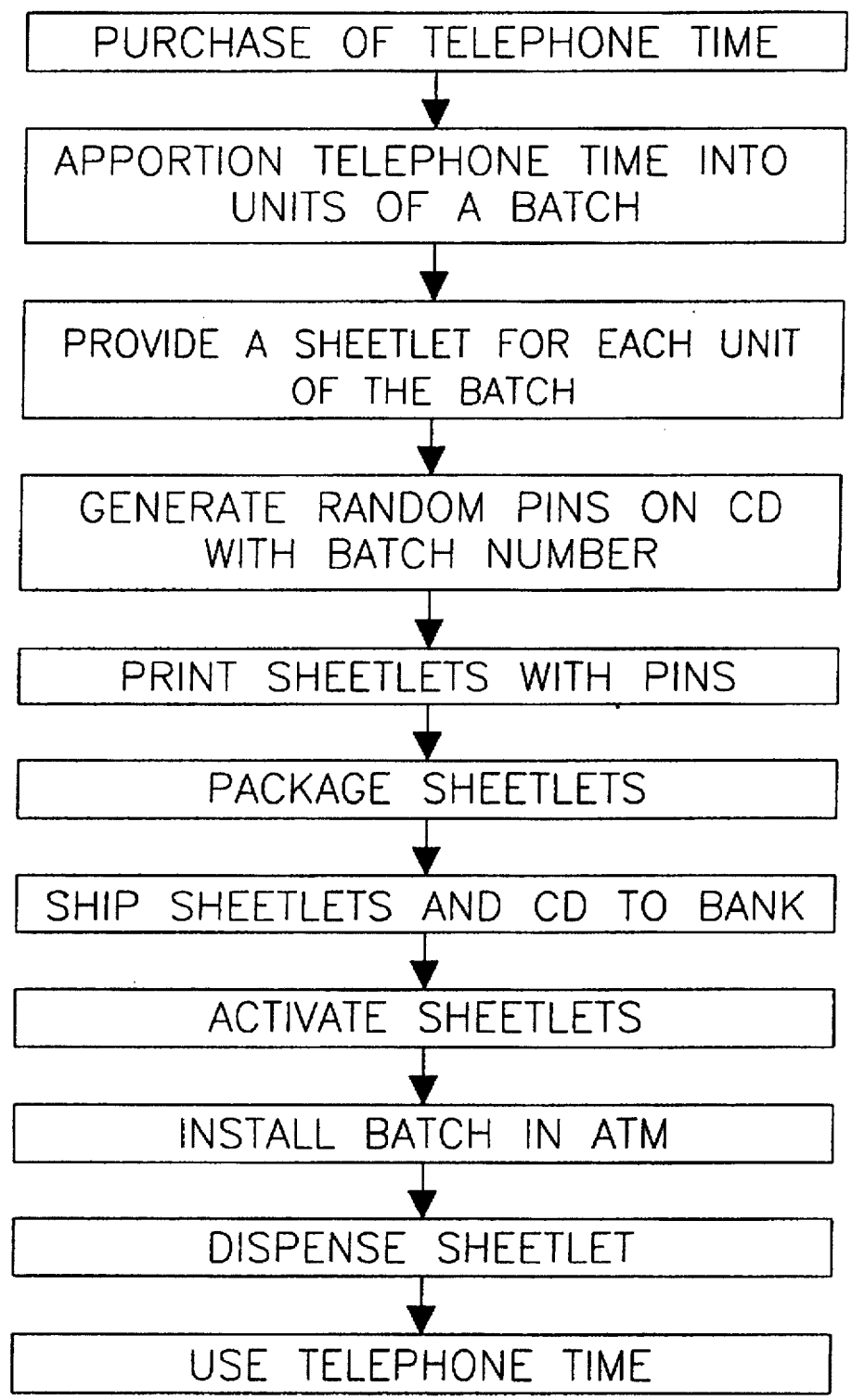
FIG. 1 is a broad a diagram illustrating events from purchase of telephone time to termination of the use of a sheetlet.

According to the present invention, there is provided a system for dispensing telephone cards (phone card) from automatic teller machines (ATM) and telephone (phone) card sheetlets for use therewith. It is a system which is more versatile and economic than current, over-the-counter phone cards.

A phone card for use with the system is a paper currency-sized sheetlet which has a coefficient of friction differential between opposed sheetlet surfaces which enables the sheetlets to be dispensed as individual sheetlets from an ATM in a manner identical to paper money. In addition, they have a lay flat quality which equals or exceeds that of paper money, and a caliper and opacity that makes each sheetlet appear as a sheet of paper currency. This allows an ATM to be used for this purpose as an alternate to its normal money dispensing function without modification of the ATM machine.

The card contains on one or more sides thereof, a personal identification number (PIN) assigned to the card and such information as is necessary for use. The PIN is preferably occluded until the time of exposure after being dispensed from the ATM. It may include information concerning predetermined durations of use, e.g., hours or fractions thereof. It may also contain on more sides advertising and other information provided by the bank or other sources of the ATM dispensed phone card. It is designed to be dispensed from one or more bins of an ATM machine in accordance with programmed information. In addition to specifying value and/or the period of use and means of use, the card may also contain advertising or other information.

The PIN numbers in any group of phone cards are random, i.e., non-sequential. This is to prevent a purchaser of one card from obtaining any information in respect of a card previously dispensed or subsequently dispensed. The PIN numbers of a group are correlated with a code for that group and provided on an unalterable source such as compact disk or its equivalent.

The group of phone cards are provided in sealed bricks of a predetermined number of sheetlets—typically about 200.

The personal identification numbers for the cards forming a brick are provided on the compact disk or its equivalent to printer by the provider. In the alternative, the personal identification numbers can be randomly generated by the printer and supplied to the provider or the distributor of the phone card on a disk, under secured conditions. The bricks are stored until utilized by a bank or other ATM provider. They need not be activated prior to being loaded into the bin of the ATM. They may be activated at any time. This may occur by simply providing the code or batch number for the group to the telephone company. In the alternative, they may be individually activated as they are dispensed from the ATM using a bar code magnetic strip or the like, which causes generation of a signal which activates the card at the telephone service provider.

A customer receives the phone card from an ATM without human interaction. The card is dispensed by programming suitable information into the ATM and a charge made against the customer's account.

The card is used by dialing a universal 800 or other designated first number from a touch-tone telephone. The PIN is entered. Preferentially, the amount of available phone time is identified to the user who is then permitted to use the phone for up to the period of time remaining on the card. At the conclusion of the remaining time, the phone call is interrupted and another card placed in service or the call terminated. If all of the time is not consumed, the telephone system provides the user with the information to initiate another call without discontinuing operation of the telephone call. A convenient way to accomplish this would be to use a pound (#) or star (*) key or a combination of the two to place another call.

It would be preferred that each time a call is placed and/or concluded, the user is reminded or informed of the remaining time available in order that the use of the card can be properly apportioned.

The card may be personalized to the individual, as by requiring the user to enter a separate user code, which has been associated with the PIN. In this instance, the card cannot be used except by correlating the PIN and the user code. The user code can conveniently be any other PIN including the PIN with which the consumer is familiar and uses on a regular basis and entered on a magnetic strip on the card and into the group of the time of card purchase. The period of use of the PIN is coterminous with the lifetime of the phone card and remains confidential. Once a phone card's time is consumed, the PIN is deleted from the system and becomes available for use with another phone card. As indicated, a phone card may, of course, be utilized with magnetic strip information to enable its use with automated telephones.

The ATM card can be dispensed from any ATM machine, whether one controlled by the bank that the consumer has an account with or from a remote ATM using the same monetary exchange media, such as the STAR System, MAC, PULSE, MAESTRO and the like.

With reference now to FIG. 1, the dispensing of a phone card has as its origin with the generation of an order of phone cards by the operator or proprietor of the ATMs. ATMs are typically owned or controlled by banks, but other financial services may provide them.

ATM machines, in addition to being located in banks may also be located in other facilities such as stores, malls, hotels, motels, and the like. In addition, they may be part of a universal banking or money transfer system such that an order for phone cards owned by one bank may be dispensed from any ATM of the system and paid for by a customer. Such systems include STAR, MAC, PULSE, Cirrus, Interlink PLUS, MAESTRO and the like.

The requirement for an ATM machine to function in the system is said to be a multiple bin or multiple drawer ATM machine unless it is dedicated to the dispensing of phone cards.

The phone cards ordered by a bank provide the bank with a unique opportunity to advertise its services and the card may be considered to be an enhancement of information dispensed. In any event, the bank will order a supply of phone cards in a predetermined number forming a group or brick and predetermined designations, i.e., specific amounts of phone time for each card of the brick. The order is placed with the supplier of phone card sheetlets to the ATM machines owned or controlled by the bank.

In the alternative, the amount of time purchased may be at the option of the consumer and the amount purchased recorded on the card at the time of purchase and recorded with the PIN, which is read from the card at the time of purchase to the supplier of telephone service.

The supplier purchases the appropriate amount of time from a phone carrier and orders from a sheetlet printer, one or more bricks of sheetlets along with a secured recorded list of personal identification numbers (PINs) for the sheetlets contained in each brick. The PIN numbers contained in a brick are random numbers provided by the supplier of sheetlets to the printer or generated by the printer or sheetlet manufacturer. In either event, all of the PIN numbers of a brick are contained on a tamper-free computer accessible record of information one or more bricks such as a compact disk.

The dispensed phone card sheetlets independent of construction must have the quality of being dispensable in the same manner as paper currency. To assure proper single sheet dispensing, a telephone card sheetlet must have the quality of being able to lay flat and have frictional characteristics to enable one sheetlet to be slid over another and an opacity which will enable an ATM machine to determine the existence of a single sheetlet. Moreover, there must be the weight and dimension to be dispensed in the same manner as paper currency.

For ATMs which dispense currency according to caliper or thickness, the phone card should have a caliper which is at least half the caliper of the currency being dispensed from the ATM. For ATMs which dispense by opacity, each sheetlet must have an opacity less than a double layer of the currency.

For the United States market, proper caliper is about 4.5 mils. For Singapore, caliper should be about 6 mils.

The surfaces of the sheetlet should have a static coefficient of friction, namely the ratio of the force required to start moving a 193.3 gram sled across a surface divided by the weight of the sled, would be about 0.55, preferably from about 0.45 to about 0.7. The coefficient of friction differential between one surface of the sheetlet to the other should be at least 25%, and within the range specified above. This allows two sheetlets to be slid past each other in the dispensing operation, insuring dispensing of single sheetlets.

The coefficient of friction differential can be realized by coating the front and back surface of the sheetlet with a material which will, by its nature, inherently provide the coefficient of friction differential necessary to enable the sheetlets to be individually dispensed. Alternatively, the sheetlets can be supplied as a laminate of two different materials of different coefficients of friction to enable the sheetlets to be individually dispensed. One surface may, for instance, be paper and the other a polymer coating or self-supporting polymer film such as a polyester. This may be achieved by applying a polymeric coat from a solvent, emulsion, or as a hot melt to the surface of the paper. Where multiple self-supporting layers are may be bonded to the other through the use of adhesives such as pressure-sensitive adhesives.

Figure 2:
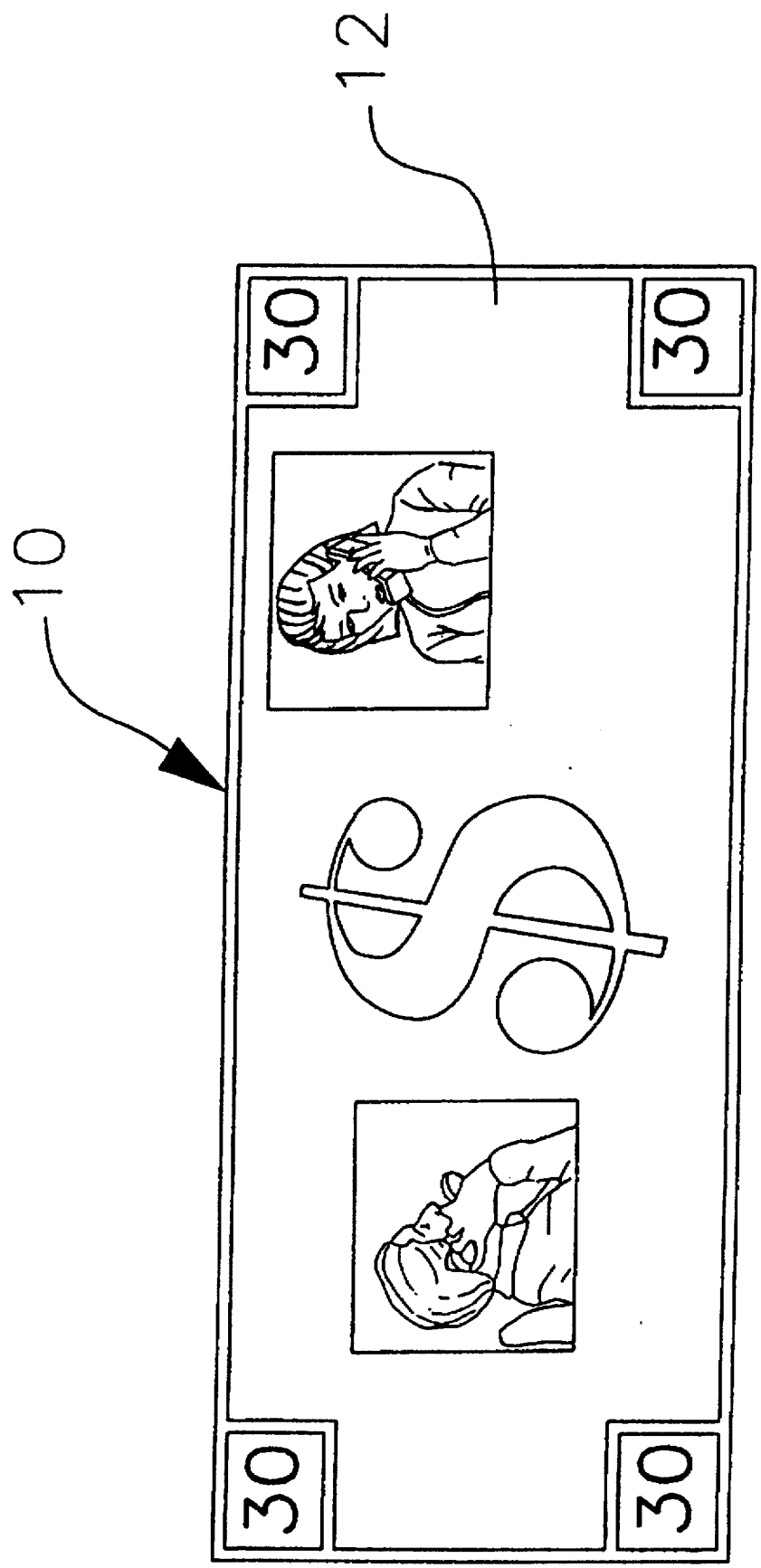
FIG. 2 is a plane view of one face of a sheetlet used in accordance with the invention.
Figure 3:
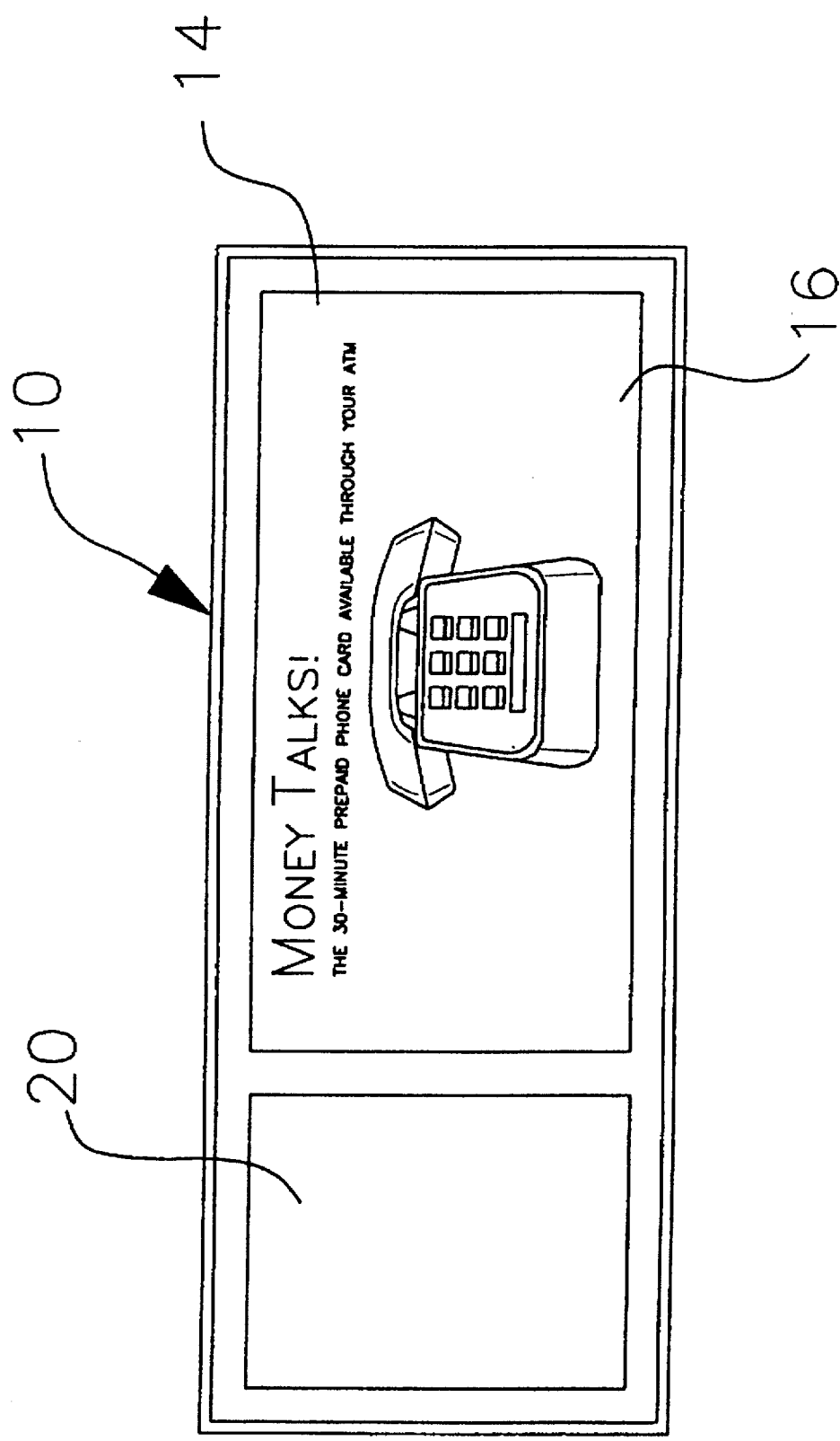
FIG. 3 is a view of the proposed surface of sheetlet with a zone 20 for printing of the PIN.
Figure 4:
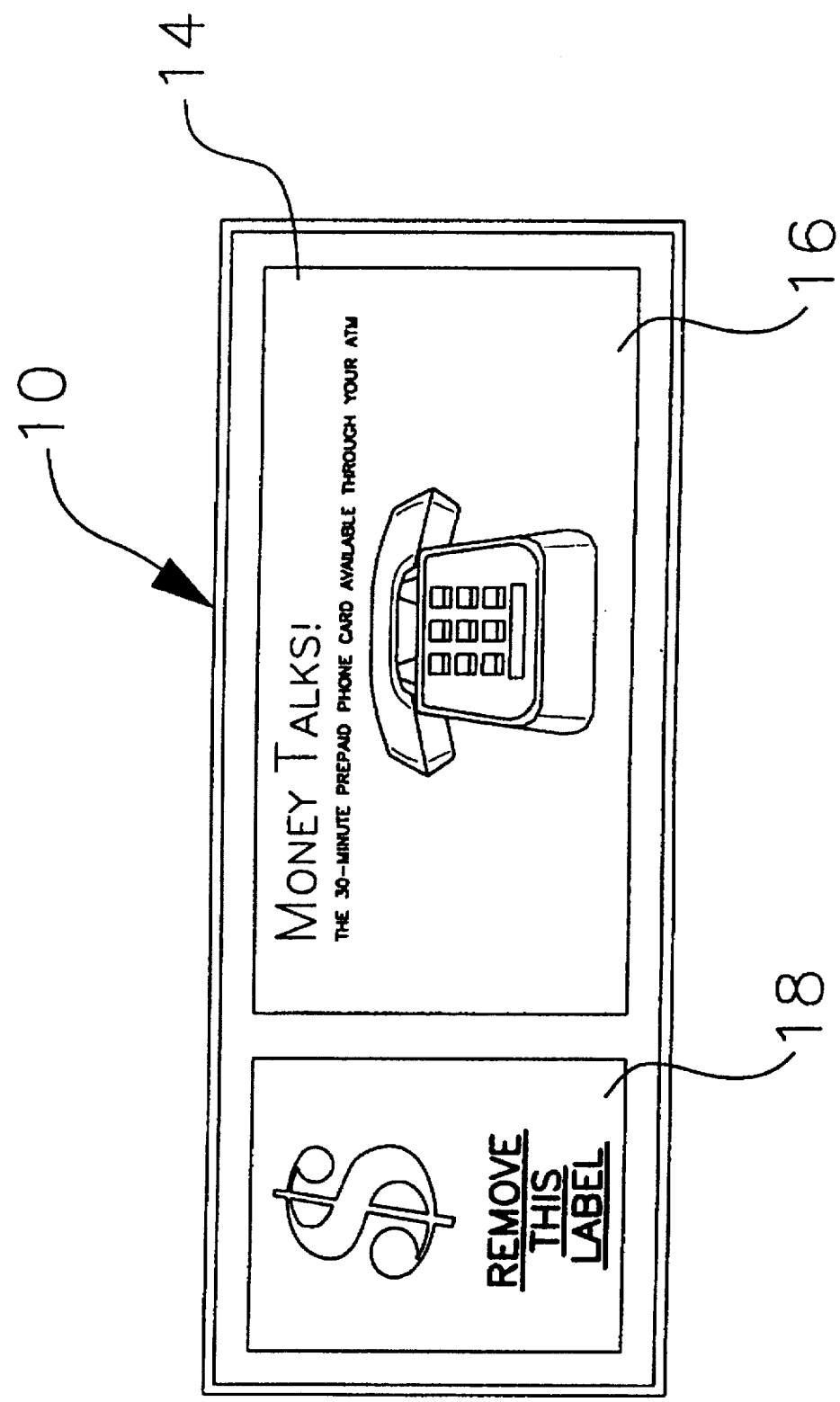
FIG. 4 shows an overlay for which occludes the PIN until removed.

A format for the phone card sheetlet is depicted in FIGS. 2 through 5. With reference to FIGS. 2 through 4, the phone card 10 may feature, on the face side 12 information concerning the amount of telephone time purchased, e.g., 30 minutes, advertising information of the bank dispensing the card and other general information.

The reverse side 14 contains information not contained on the face side. It may include a zone 16 containing additional general information concerning the card and/or advertising and a zone 18 containing more specific information regarding the use of the card. This would include, as is shown, the 800 number to be dialed for use of the card and the PIN or authorization number to be entered against which the calling time will be charged, and other detailed instructions concerning use of the card.

For maximum security, the information may, as shown at FIG. 4, be occluded by the use of an opaque coating which can be rubbed or scratched off, or a thin over-label which will mask the information and in particular the PIN, until the time of exposure, e.g., time of first use of the card. At that time, the coating or cover 20 would be removed to expose at least the PIN. This protection can be in the form of a thin over-label, which is adhered to the card by a removable pressure-sensitive adhesive, allowing it to be peeled away to expose the dialing information and PIN, or it may be in form of an over-coating applied like a paint, which can be rubbed off to expose the PIN and any other occluded information.

Figure 5:
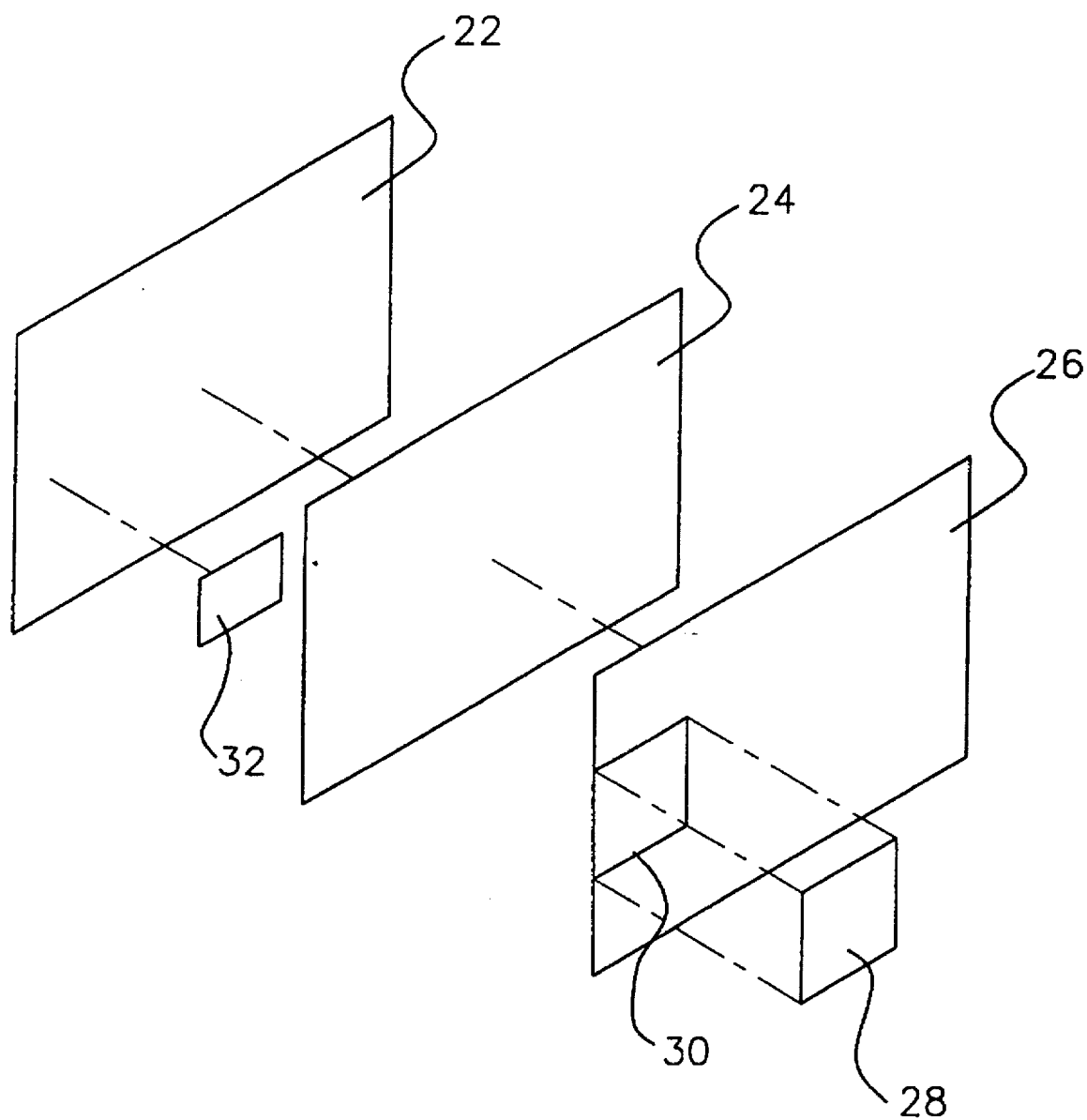
FIG. 5 is an expanded view of one construction of the instant invention.

Another feature would be to die cut the area conforming to zone 18 to the next layer of the laminate as shown in FIG. 5, allowing the use and PIN information to be peeled from the card and attached to another substrate such as the ATM card, allowing the phone card to be discarded and the ATM card used as a carrier for the information. In the alternative, the sheetlet can remain as the carrier of the PIN.

For a more complex construction as shown in FIG. 5, the phone card may be a three (3) layer laminate. One layer 22 forming one exposed surface of the card and an adhesive layer 24 and a second layer 26 providing a section 28, which may be die cut upon formation of the laminate through the adhesive layer 24 to a release on the front layer 22. The die cut is about the periphery 30 of the insert 28. This allows the segment 28 to be peeled away from the card with a portion of the adhesive 24 for application to another substrate. A release material 32 is provided on a portion or all of layer 22 to enable release of the die cut segment 28. Instead of die cutting segment 28 may be formed of multiple perforations.

In this construction, segment 28 carries the use and card PIN. Adhesive layer 24 should be a removable adhesive of a peel strength which will allow the section to be peeled away not only from release 32, but also from the subsequent surface such as an ATM card, without leaving an adhesive residue. Suitable adhesives are removable acrylic adhesives.

In the presently preferred construction the face 12 is printed with multiple colors, providing a phone card of attractive presentation. The reverse side 14 is printed in a single color, typically blue or black or other dark color. In addition, in the presently preferred construction, the card, whether single layer or multiple layer, is paper with the friction differential achieved by printed coatings on the face 12 and reverse side 14 of card 10.

Ordinary paper can be properly converted to sheetlets by coating the front and back surface to provide the coefficient of friction differential to allow one sheetlet to be slid over another and therefore dispensable from a bin of an ATM. A coating can also be used to enhance lay flat characteristics.

The presently preferred construction employs paper with a printed layer including the PIN having thereover one or more overlaminate coating. Paper is underprinted with additional information and coated. The coatings provide the coefficient friction differential coefficient friction differential necessary to assure proper dispensing.

In a more complex construction, a self-supported underlayer 22 is underprinted with information and silicone coating is applied to the opposed surface of the underlayer 22. A removable pressure-sensitive adhesive layer 24 is printed over the release and adhered to a face layer 26 containing the additional printing and on a zone thereof 28 the PIN. This is overcoated with a control coating (not shown) which may be transparent or opaque and preferably opaque in the zone where the PIN is applied. The overlayer is then die cut 30 at the zone 28 to the release coating enabling the zone containing the PIN to be separated from the laminate if desired. The coating preferably of a polyester.

The sheetlets of one or more bricks are printed on one or both sides with the proper value for the phone card or the corresponding phone time in minutes or hours, and on the reverse side with PIN and use information. The PINs of a brick are printed with randomly generated numbers. In a preferred process, the compact disks are provided to the printer and the PIN is entered from the compact disk onto the sheetlets. The compact disk (CD) is then shipped with the brick of phone card sheetlets to the purchaser of the sheetlets.

The purchaser of the sheetlets in turn supplies or delivers bricks of sheetlets and the CD and/or control list to the bank, either directly or to a service retained by the bank to handle the bricks for installation in the ATMs.

On delivery to the service or bank, the PIN numbers can be activated, which means that the phone card now has value and the phone service is supplied with the PIN numbers. The bank in turn will be billed by the supplier of the sheetlets for their agreed value.

Activation can be delayed until the brick is installed in an ATM. At the time of activation, the identification or batch number is used to activate the random PINs of the brick so that any phone card of the brick can be used immediately upon dispensing from the ATM. In the alternate the card may contain a magnetic strip; bar code or any other device which activates card when it is dispensed.

The bricks are installed in the ATM machines and consumers purchase them by following the procedure assigned to dispense the cards from the ATM machine. One or more bins may be utilized for dispensing phone cards with each bin containing sheetlets of defined predetermined value. When the phone card is purchased, the account of the consumer is charged for the number and value of phone cards purchased. Once the sheetlets are dispensed from the ATM, anyone in possession of the sheetlets can utilize the available phone time by dialing a designated number usually an 800 or other area code and entering the PIN using instructions provided on the sheetlet. At that time the phone carrier would know that a sheet of the brick has been put into service and that all sheetlets of the brick are activated. This may trigger payment for all PINs or sheetlets having the PINs assigned to the brick.

As an additional security measure and since ATM card holders normally have their own personal identification number (PIN 2), the second coded number (PIN 2) may be transmitted to the phone carrier for use in combination with the dispensed sheetlet such that the two PINs have to be entered into the phone before the sheetlet can be used. This second entry of PIN 2 can be required for each usage of the phone or only when the telephone card is first used. As indicated this provides a second level of security which can be unique to the bank dispensed phone card allowing significantly higher values to be placed on the dispensed phone cards. For this embodiment, the phone card can contain a magnetic strip bearing the PIN which is recorded. The PIN and user PIN (PIN 2) are recorded in a CD or sent to the telephone service for use in combination. In this secured manner the PIN of the card and PIN 2 can be signaled and transmitted along with the amount of time purchased to the telephone company and recorded as a charge against the account of the consumer.

What is claimed is:

1. A method of providing telephone time from automatic teller machines, which comprises in combination:

(a) ordering a predetermined amount of phone time for a telephone service;

(b) apportioning the ordered phone time into a designated number of currency sized automatic teller machines dispensable sheetlets forming a group;

(c) printing on each sheetlet of the group a random generated personal identification numbers correlated with a predetermined amount of telephone time;

(d) assigning a batch number to the group;

(e) packaging the PIN containing sheetlets of the group of sheetlets for installation in an automatic teller machine;

(f) supplying the group of sheetlets and listed PINS of sheetlets and batch number for such sheetlets to an installer of sheetlets in the automatic teller machine and supplier of telephone services;

(g) activating and installing the sheetlets in an automatic teller machine (ATM), (h) dispensing a sheetlet from the ATM upon entry of machine acceptable command of a sheetlet purchaser;

(i) initiating the consumption of purchased telephone time with identity of the PIN to the supplier of telephone service; and (j) terminating the use of the dispense card with the consumption of the purchased telephone time.

2. The method as claimed in claim 1, in which a personal identification number at the time of activation is correlated with an arbitrary user code by a telephone, said correlation remaining active for the period of use of the phone card.

3. A method as claimed in claim 2, in which the user code is entered at the time of purchase of the sheetlet.

4. A method as claimed in claim 1 in which the sheetlet has a coefficient of frictional difference between the top and the bottom surface thereof of at least 25%.

5. A process as claimed in claim 2 in which the sheetlet has a coefficient of friction difference between the top and the bottom surface thereof of at least 25%.

6. A method as claimed in claim 3 in which the sheetlet has a coefficient of friction difference between the top and the bottom surface thereof of at least 25%.

7. A process as claimed in claim 1 in which each sheetlet is a laminate of a self-supporting first layer printed on one surface as coated on an opposed surface with a release material, a removable pressure-sensitive adhesive layer on the release coating and a second self-supporting layer on the removable pressure-sensitive adhesive layer, said second layer containing in a zone thereon the PIN.

8. A method as claimed in claim 7 in which the zone of the second layer containing the PIN is cut to the release to allow separation of the zone containing the PIN from the sheetlet.

9. A method as claimed in claim 2 in which each sheetlet is a laminate of a self-supporting first layer printed on one surface as coated on an opposed surface with a release material, a removable pressure-sensitive adhesive layer on the release coating and a second self-supporting layer on the removable pressure-sensitive adhesive layer, said second layer containing in a zone thereon the PIN.

10. A method as claimed in claim 9 in which the zone of the second layer containing the PIN is cut to the release to allow separation of the zone containing the PIN from the sheetlet.

11. A method as claimed in claim 3 in which each sheetlet is a laminate of a self-supporting first layer printed on one surface as coated on an opposed surface with a release material, a removable pressure-sensitive adhesive layer on the release coating and a second self-supporting layer on the removable pressure-sensitive adhesive layer, said second layer containing in a zone thereon the PIN.

12. A method as claimed in claim 11 in which the zone of the second layer containing the PIN is cut to the release to allow separation of the zone containing the PIN from the sheetlet.

\* \* \* \* \*

UNITED STATES PATENT AND TRADEMARK OFFICE
CERTIFICATE OF CORRECTION

PATENT NO. : 5,673,309
DATED : September 30, 1997
INVENTOR(S) : Eugene A. Woynoski; Carol A. Caldwell; Wayne A. Beeder; George W. Jensen It is certified that error appears in the above-indentified patent and that said Letters Patent is hereby corrected as shown below:

Column 2, line 3, before "separable" delete "a"; after "from" insert -- the --.
Column 2, line 15, replace "broad a" with -- block --.
Column 3, line 20, change "bydialing" to -- by dialing --
Column 3, line 45, replace "group of" with -- group at --.
Column 4, line 32, after "information" insert -- in --.
Column 5, lines 5,6, replace "Where multiple self-supporting layers are may" with -- Multiple self-supporting layers may --.
Column 5, line 55, after "cutting" insert a comma.
Column 6, line 7, replace "also he used" with -- also be used --.
Column 6, line 12, replace the entire line with -- coefficient of friction differential --.
Column 6, line 18, replace "zone thereof 28" with -- zone 28 thereof --.
Column 6, line 24, replace "preferably of a polyester" with -- is preferably a polyester --.
Column 6, line 51, after "activates" insert -- the --.
Column 7, line 18, after "company" insert a comma.
Column 7, line 47, change "dispense" to -- dispensed --.

Signed and Sealed this

Second Day of February, 1999

Attest:

Attesting Officer

*Acting Commissioner of Patents and Trademarks*